(12) United States Patent
Torrico-Bascopé et al.

(10) Patent No.: US 8,238,121 B2
(45) Date of Patent: *Aug. 7, 2012

(54) DC/DC CONVERTER

(75) Inventors: Grover Victor Torrico-Bascopé, Kista (SE); Fernando Ruiz Gomez, Sollentuna (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/150,997

(22) Filed: Jun. 1, 2011

(65) Prior Publication Data

US 2011/0273911 A1     Nov. 10, 2011

Related U.S. Application Data

(63) Continuation of application No. PCT/CN2010/072439, filed on May 4, 2010.

(51) Int. Cl.
*H02M 3/335*     (2006.01)
(52) U.S. Cl. .................................. 363/21.06; 363/21.02
(58) Field of Classification Search .................... 363/16, 363/20, 21.02, 21.04, 21.06
See application file for complete search history.

(56) References Cited

U.S. PATENT DOCUMENTS

| | | | |
|---|---|---|---|
| 4,811,185 A * | 3/1989 | Cook et al. | 363/17 |
| 7,589,980 B2 * | 9/2009 | Aso | 363/17 |
| 7,696,733 B2 * | 4/2010 | Osaka | 323/267 |
| 2009/0290383 A1 | 11/2009 | Zhou et al. | |
| 2012/0033452 A1 * | 2/2012 | Torrico-Bascope et al. | 363/21.02 |

FOREIGN PATENT DOCUMENTS

CN     87208958 U     10/1988
(Continued)

OTHER PUBLICATIONS

Torrico-Bascopé,Grover V. et al."Generation of a Family of Non-Isolated DC-DC PWM Converters Using New Three-State Switching Cells" IEEE. 2000:858-863.

(Continued)

*Primary Examiner* — Matthew Nguyen
(74) *Attorney, Agent, or Firm* — Brinks Hofer Gilson & Lione

(57) ABSTRACT

The present invention relates to a DC/DC converter (1) with primary side (11) consisting of a resonant converter, which DC/DC converter (1) comprises a first and a second transformer (T1, T2), connected in series on the primary side (11) and on the secondary side (12) of the DC/DC converter. The secondary side (12) comprises an autotransformer (Tcd) consisting of a first and a second winding (Tcda, Tcdb) connected to a common center tap (Tcdc), where the first winding (Tcda) of the autotransformer (Tcd) is connected to the secondary winding (T1*b*) of the first transformer (T1), forming a first output connection point (P1), the second winding (Tcdb) of the autotransformer (Tcd) is connected to the secondary winding (T2*b*) of the second transformer (T2), forming a second output connection point (P2), and the center tap (Tcdc) of the autotransformer (Tcd) is connected to the positive output (21) of the secondary side (12). The secondary side (12) also comprises a first and a second rectifying switching device (S1, S2), where the first rectifying switching device (S1) is connected between the first output connection point (P1) and the negative output (22) of the secondary side (12), and the second rectifying switching device (S2) is connected between the second output connection point (P2) and the negative output (22) of the secondary side (12). The present invention also relates to a DC/DC converter system comprising at least two inventive DC/DC converters (1).

18 Claims, 1 Drawing Sheet

FOREIGN PATENT DOCUMENTS

| | | |
|---|---|---|
| CN | 1592061 A | 3/2005 |
| CN | 100420135 C | 3/2005 |
| JP | 2000050650 A | 2/2000 |
| WO | WO 2011/137583 A1 | 11/2011 |

OTHER PUBLICATIONS

Klaassens, J. Ben et al. "Phase-Staggering Control of a Series-Resonant DC-DC Converter with Paralleled Power Modules" IEEE Transactions on Power Electronics, vol. 3 No. 2. Apr. 2, 1998:164-173.

Yang, Bo et al. "Over Current Protection Methods for LLC Resonant Converter" IEEE. 2003:605-610.

Lazar, James F. "Steady-State Analysis of the LLC Series Resonant Converter" IEEE. 2001:728-735.

International Search Report and Written Opinion of the International Searching Authority issued in corresponding PCT Patent Application No. PCT/CN2010/072439, mailed Feb. 17, 2011.

Office Action issued in commonly owned U.S. Appl. No. 13/275,965, mailed Feb. 24, 2012.

* cited by examiner

DC/DC CONVERTER

CROSS-REFERENCE TO RELATED APPLICATION

This application is a continuation of International Application No. PCT/CN2010/072439, filed on May 4, 2010, which is hereby incorporated by reference in its entirety.

FIELD OF INVENTION

The present invention relates to a DC/DC converter with primary side consisting of a resonant converter, which converter comprises at least one transformer, and a converter system comprising at least two inventive DC/DC converters.

DESCRIPTION OF BACKGROUND ART

The developing trend of the AC/DC, DC/DC converters is high efficiency and high power density. Through the Resonant AC/DC, DC/DC Converters it is easier to achieve high efficiency due to its feature of soft-switching.

However, there are still certain existing drawbacks regarding the Resonant Converters, e.g., the high AC-current of the output filter resulting in the high power losses and the large volume of the output filter. Furthermore, the center tapped transformer is less efficient and more difficult to optimize due to the passive winding.

The most widely used Series Resonant Converter found in the industry is the LLC-Resonant Converter, due to its availability to achieve high efficiency. This topology has been described in different publications, an example of this is the publication "Steady-state analysis of the LLC Converter", IEEE 16th Annual Applied Power Electronics Conference, Volume: 2, pp: 728-725, March 2001 by James F Lazar, Robert Martinelli.

The current protection of the circuit disclosed in this publication has been analyzed and the solution using splitting resonant capacitors and clamping diodes has been presented in the publication "Over Current Protection Methods of the LLC Resonant Converter", IEEE 18th Annual Applied Power Electronics Conference, Volume: 2, pp: 605-609, February 2003, by Bo Yang, Fred Lee, Matthew Concannon.

For low voltage/high current applications and for high power applications in particular, it has been known to place two or more Resonant Converters in series and/or parallel, as described in the publication "Phase-Staggering Control of a Series-Resonant DC-DC Converter with Paralleled Power Modules", IEEE Transactions on Power Electronics, Volume: 3, pp: 164-173, April 1988, by Ben Klaassens, W. L. F. H. A. Moize de Chateleux, M. P. N. Van Wesenbeeck.

The present invention uses the concept of the so called Three-State Switching Cell (TSSC) in a novel manner, however, the Three-State Switching Cell is part of the prior art of the present invention and it is described in publication "Generation of a family of non-isolated DC-DC PWM converters using a three-state switching cell", IEEE 31th Annual Power Electronics Specialists Conference, Volume: 2, pp: 858-863, 18-23 Jun. 2000, by G. V. T. Bascopé and Ivo Barbi.

SUMMARY OF THE PRESENT INVENTION

Technical Problems

It is a general problem regarding two stage rectifiers to meet requirements of efficiency in the DC/DC Converter.

It is also a problem to improve the thermal distribution in a DC/DC converter.

Yet another problem regarding DC/DC converters is to meet the demand of increasing DC power.

It is also a problem to reduce the AC ripple on the output capacitors, and to do this without having to increase the number of needed capacitors.

Another problem is to reduce the voltage stress when the input voltage is high, and to reduce the current stress.

Achieving high efficiency in the topological circuits existing in the market today is only possible with increased number of semiconductors, magnetic components and amount of copper within the possibilities of the state of the art of power electronics. This will however increase the power density.

If a converter is going to be optimized for high density, the efficiency will definitely be lower.

The choice for optimization in the existing solutions according to the background art is either efficiency or high density, but never both.

Solution

With the purpose of providing a novel topological circuit specially suitable for high power, high efficiency and high density applications in the art of power electronics and of solving one or more of the above indicated problems, and from the standpoint of the above indicated field of invention, the present invention teaches that the secondary side of the DC/DC converter comprises an autotransformer consisting of a first and a second winding connected to a common center tap, which autotransformer is adapted to act as a current doubler.

One embodiment of the present invention teaches that the at least one transformer can be a first and a second transformer (T1, T2), connected in series on the primary side and on the secondary side of said DC/DC converter.

The first winding of the autotransformer is connected to the secondary winding of the first transformer, forming a first output connection point, the second winding of said autotransformer is connected to the secondary winding of the second transformer, forming a second output connection point, and the center tap of the autotransformer is connected to the positive output of the secondary side.

The secondary side also comprises a first and a second rectifying switching device, which first rectifying switching device is connected between the first output connection point and the negative output of the secondary side, and which second rectifying switching device is connected between the second output connection point and the negative output of the secondary side.

Adding the autotransformer on the secondary side, will allow the removal of the centre tap of the transformer and will also reduce the current on the secondary side to half the original value.

Removing the centre tap of the transformer is not only increasing the efficiency, but also simplifying the layout of the secondary side, and thereby greatly reducing the increased complexity when a number of converters are connected in parallel.

Another important feature in the invention is that the transformer on the converter is divided in order to reduce the voltage and current stress. Two transformers are connected in series on the primary side reducing the voltage stress. On the secondary side, the windings are also connected in series in order to achieve the required output voltage without changing the turns-ratio of the transformer as is required in the current doublers of the state of the art.

Furthermore, the manufacturing process of the transformers is improved as well.

The present invention teaches that the first and second rectifying switching device can either consist of a first and second transistor, or a first and second rectifying diode. If transistors are used then it is preferred if that the first and second transistor is adapted to synchronous rectification.

Using transistors and synchronous rectification provides a possibility to meet the requirements of increased efficiency. However, the complexity of this is increasing if a number of converters are paralleled, in which case it could be preferred to use rectifying diodes.

The present invention teaches that the primary side if the inventive DC/DC converter may consist of a resonant converter, which resonant converter can be an LLC resonant converter that can work in both Buck and Boost mode in order to achieve wide input and output voltages.

As can be seen in the description of the secondary side, this side follows the principles of a Three-State Switching Cell (TSSC).

The present invention also relates to a DC/DC converter system, which system comprises at least two inventive DC/DC converters. These DC/DC converters can be connected in parallel or in series. It is also possible to connect the DC/DC converters in an inventive DC/DC converter system in series on the primary side and in parallel on the secondary side, or in parallel on the primary side and in series on the secondary side.

It is proposed that when the system comprises two DC/DC converters, it is possible that the DC/DC converters are interleaved with 90 degrees phase shift. The system can then be adapted to be powered from an input source, and to receive a three-level voltage (P, M, N) from the input power source. One such input from a source can be a power factor correction regulator, in which case it is proposed that the system comprises two input capacitors through which said input source is connected.

Paralleling of converters is a way to solve the demand of increasing DC-power, and interleaving them with phase shift will reduce the AC-current ripple on the output capacitors which will reduce the number of capacitors needed.

A series connection on the primary side can be used to reduce the voltage stress when the input voltage is high. For the secondary side, it is proposed that the outputs of the converters are put in parallel in order to reduce the current stress.

The reliability of the converter is increased due to the reduction of the current stress on the winding of the transformers and the improved thermal distribution in the unit.

It is proposed that the output filter of the secondary side consist of an output capacitor and an output EMI filter.

Advantages

The advantages of a converter and a system according to the present invention are that a very high efficiency and high power density can be achieved.

The invention provides simplified and more efficient transformers, as the passive winding has been removed, due to the function of operation of the 3SSC.

Increased reliability is provided due to a better thermal distribution.

The simplified and more efficient layout on the secondary side also reduces the losses.

Interleaving two or more converters reduces the number of capacitors needed for the output filter when phase-shifting control is used.

Splitting the transformers on each converter provides a reduced voltage and current stress and consequently reduces the losses.

The high density is provided due to the reduction of the number of output capacitors and reduced total size of the transformer (s) due to the characteristics of the topological circuit.

The invention also provides a simplified transformer manufacturing and PCB assembly.

A circuit according to the present invention can be implemented for any power level as there is no inherent limitation in the topological circuit.

A circuit according to the present invention can also be extended for any number of converters and different kind of connections (series/parallel) or for a single DC/DC Resonant Converter.

BRIEF DESCRIPTION OF THE DRAWINGS

A DC/DC converter and a DC/DC converter system according to the present invention will now be described in detail with reference to the accompanying drawings, in which:

FIG. 2 is a schematic and simplified illustration of a second proposed embodiment of a single DC/DC converter, FIG. 3 is a schematic and simplified illustration of a first proposed embodiment of a DC/DC converter system with two converters connected in series, FIG. 4 is a schematic and simplified illustration of a second proposed embodiment of a DC/DC converter system with two converters connected in parallel.

DESCRIPTION OF EMBODIMENTS AS PRESENTLY PREFERRED

Figure 1:
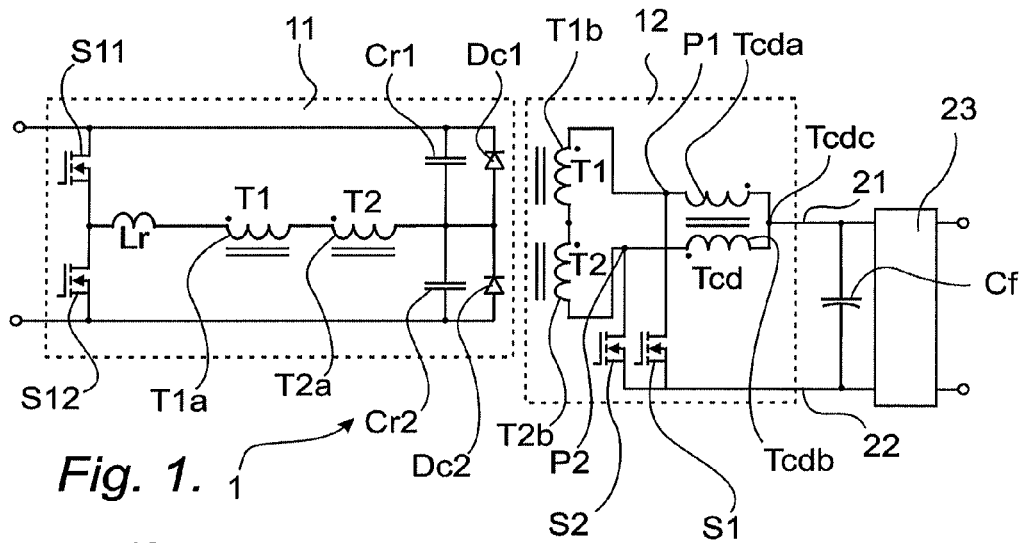
FIG. 1 is a schematic and simplified illustration of a first proposed embodiment of a single DC/DC converter.

The present invention will now be described with reference to FIG. 1 showing a DC/DC converter 1 with primary side 11 consisting of a resonant converter, the DC/DC converter 1 comprising at least one transformer, in the following embodiments exemplified by a first and a second transformer T1, T2, connected in series on the primary side 11 and on the secondary side 12 of said DC/DC converter.

The figure shows schematically the primary winding T1a of the first transformer T1 and the primary winding T2a of the second transformer T2 on the first side 11 of the converter 1. It also shows the secondary winding T1b of the first transformer T1 and the secondary winding T2b of the second transformer T2 on the second side 12 of the converter 1.

The secondary side 12 of said DC/DC converter 1 comprises an autotransformer Tcd consisting of a first and a second winding Tcda, Tcdb connected to a common centre tap Tcdc. The autotransformer Tcd is adapted to act as a current doubler.

The first winding Tcda of the autotransformer Tcd is connected to the secondary winding T1b of the first transformer T1, forming a first output connection point P1, the second winding Tcdb of the autotransformer Tcd is connected to the secondary winding T2b of the second transformer T2, forming a second output connection point P2, and the center tap Tcdc of the autotransformer Tcd is connected to the positive output 21 of the secondary side 12.

The secondary side 12 also comprises a first and a second rectifying switching device S1, S2, where the first rectifying switching device S1 is connected between the first output connection point P1 and the negative output 22 of the secondary side 12, and the second rectifying switching device S2 is connected between the second output connection point P2 and the negative output 22 of the secondary side 12.

The rectifying switching devices S1, S2 can be realised through different means of switching or controlling the currents from the first and second connection point P1 and P2 to the negative output 22 of the secondary side 12. In FIG. 1 an embodiment of the present invention is illustrated where the first and second rectifying switching device S1, S2 is consisting of a first and second transistor, and it is proposed that that the first and second transistor is adapted to synchronous rectification.

FIG. 2, only showing the secondary side 12 of the DC/DC converter 1, illustrates an alternative embodiment of the present invention where the first and second rectifying switching device S1', S2' is consisting of a first and second rectifying diode.

With renewed reference to FIG. 1, an embodiment of an inventive converter 1 is shown where the primary side 11 consists of a resonant converter, in this case an LLC resonant converter that can work in both Buck and Boost mode in order to achieve wide input and output voltages.

The figure shows an example where the first side of the converter 11 is a symmetrical half bridge converter with a first and second clamping diode Dc1, Dc2. As an illustrating example, the first side 11 of the converter 1 comprises a first and a second main switch S11, S12, in the figure exemplified as main transistors, a resonant inductor Lr, and a first and second resonant capacitor Cr1, Cr2 in parallel with the first and second clamping diode Dc1 and Dc2 respectively.

It can be seen that the secondary side 12 of the inventive converter 1 consist of a Three-State Switching Cell (TSSC).

The present invention also relates to a DC/DC converter system comprising at least two DC/DC converters according to the present invention. It shall be understood that the number of used converters is decided by the implementation of the invention, and that the invention is not limited to any number of converters. For the sake of simplicity, two converters are shown in the embodiments illustrated in the description and the figures, and FIGS. 3 to 6 shows different exemplifying embodiments of how two DC/DC converters 31, 32 can be arranged into a DC/DC converter system 3.

FIG. 3 shows that the converters 31, 32 are connected in parallel.

FIG. 4 shows that the converters 31, 32 are connected in series.

Figure 5:
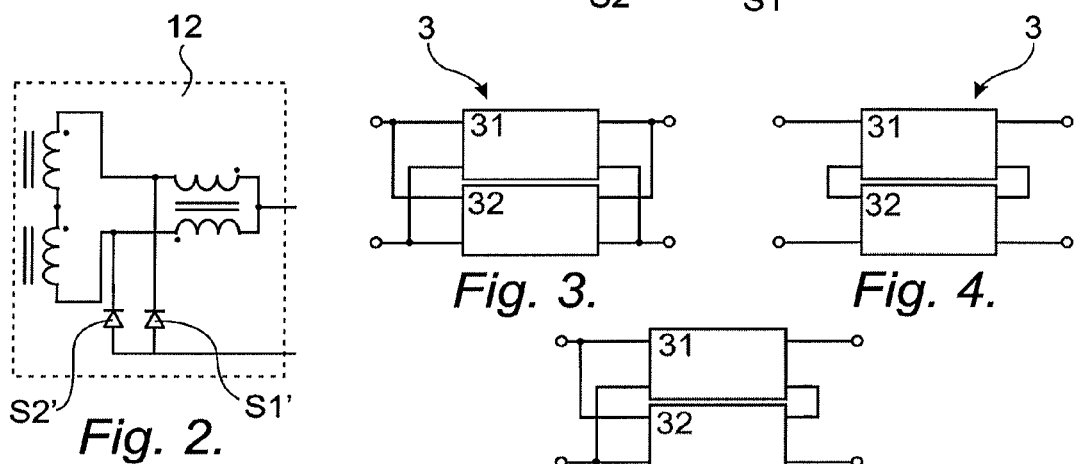
FIG. 5 is a schematic and simplified illustration of a third proposed embodiment of a DC/DC converter system with two converters connected in parallel on the primary side and in series on the secondary side.

FIG. 5 shows that the converters 31, 32 are connected in parallel on the primary side 11 and in series on the secondary side 12.

Figure 6:
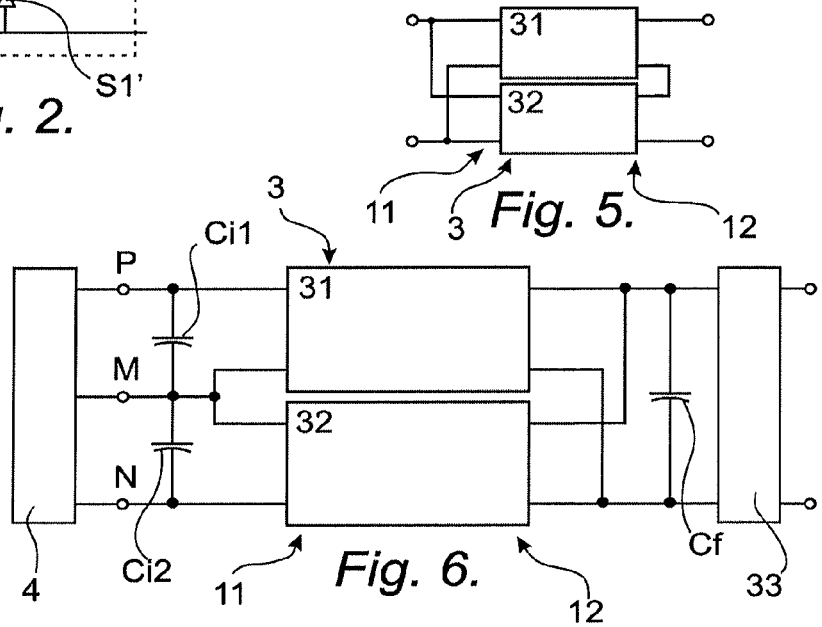
FIG. 6 is a schematic and simplified illustration of a fourth proposed embodiment of a DC/DC converter system with two converters connected in series on the primary side and in parallel on the secondary side.

FIG. 6 shows that the converters 31, 32 are connected in series on the primary side 11 and in parallel on the secondary side 12.

FIG. 6 also shows an embodiment where the system 3 comprises two DC/DC converters 31, 32, which converters are interleaved with 90 degrees phase shift.

The system 3 is adapted to be powered from an input source 4, and to receive a three-level voltage P, M, N from the input power source 4. Such input power source 4 can for instance be a power factor correction regulator. In the figure it is shown that the system 3 comprises a first and a second input capacitor Ci1, Ci2 through which the input power source 4 is connected.

Regardless of implementation, and whether there is a single DC/DC converter or a system with at least two DC/DC converters, it is proposed that an output filter of the secondary side consist of an output capacitor and an output electromagnetic interference (EMI) filter. This is shown in FIG. 1 as the output capacitor Cf and the output filter 23, and in FIG. 6 as the output capacitor Cf and an output filter 33.

It will be understood that the invention is not restricted to the aforedescribed and illustrated exemplifying embodiments thereof and that modifications can be made within the scope of the inventive concept as defined in the accompanying Claims.

The invention claimed is:

1. A DC/DC converter with primary side consisting of a resonant converter, the DC/DC converter comprising at least one transformer, including a first and a second transformer connected in series on a primary side and on the secondary side of said DC/DC converter, wherein the secondary side of said DC/DC converter comprises an autotransformer including of a first and a second winding connected to a common center tap, configured to act as a current doubler, that said first winding of said autotransformer is connected to the secondary winding of said first transformer, forming a first output connection point, that the second winding of said autotransformer is connected to the secondary winding of said second transformer, forming a second output connection point, that the center tap of said autotransformer is connected to the positive output of said secondary side, that said secondary side comprising a first and a second rectifying switching device, that said first rectifying switching device is connected between said first output connection point and the negative output of said secondary side, and that said second rectifying switching device is connected between said second output connection point and the negative output of said secondary side.

2. The converter according to claim 1, wherein said first and second rectifying switching device comprise a first and second transistor, and that said first and second transistors are configured for synchronous rectification.

3. The converter according to claim 1, said first and second rectifying switching device comprise a first and second rectifying diode.

4. The converter according to claim 1, wherein said primary side comprises a resonant converter.

5. The converter according to claim 4, wherein said resonant converter is an LLC resonant converter that operates in both Buck and Boost mode in order to achieve wide input and output voltages.

6. The converter according to claim 1, wherein said secondary side comprises a Three-State Switching Cell.

7. The converter according to claim 1, wherein the output filter of said secondary side comprises an output capacitor and an output EMI filter.

8. A DC/DC converter system, wherein said system comprises at least two DC/DC converters with a primary side comprising a resonant converter, the DC/DC converter comprising at least one transformer, including a first and a second transformer connected in series on a primary side and on a secondary side of said DC/DC converter, wherein the secondary side of said DC/DC converter comprises an autotransformer including of a first and a second winding connected to a common center tap, configured to act as a current doubler, that said first winding of said autotransformer is connected to the secondary winding of said first transformer, forming a first output connection point, the second winding of said autotransformer connected to the secondary winding of said second transformer, forming a second output connection point, the center tap of said connected to the positive output of said secondary side, that said secondary side comprises a first and a second rectifying switching device, that said first rectifying switching device is connected between said first output connection point and the negative output of said secondary side, and said second rectifying switching device is connected between said second output connection point and the negative output of said secondary side.

9. The converter system according to claim 8, wherein said DC/DC converters are connected in parallel.

10. The converter system according to claim 8, wherein said DC/DC converters are connected in series.

11. The converter system according to claim 8, wherein said DC/DC converters are connected in parallel on said primary side and in series on said secondary side.

12. The converter system according to claim 8, wherein said DC/DC converters are connected in series on said primary side and in parallel on said secondary side.

13. The converter system according to claim 12, wherein said system comprises two DC/DC converters, and that said DC/DC converters are interleaved with 90 degrees phase shift.

14. The converter system according to claim 13, wherein said system is configured to be powered from an input source, and is configured to receive a three-level voltage (P, M, N) from said input power source.

15. The converter system according to claim 13, wherein said system is configured to receive its input from a source which is a power factor correction regulator, and said system comprises two input capacitors through which said input source is connected.

16. The converter system according to claim 14, wherein said system is configured to receive its input from a source which is a power factor correction regulator, and that said system comprises two input capacitors through which said input source is connected.

17. The converter system according to claim 8, wherein the output filter of said secondary side of an output capacitor and an output EMI filter.

18. The converter system according to claim 8, wherein said secondary side comprises a Three-State Switching Cell.

* * * * *